(12) United States Patent
Zeung et al.

(10) Patent No.: US 12,326,989 B2
(45) Date of Patent: *Jun. 10, 2025

(54) WIRELESS COMMUNICATION SYSTEM CAPABLE OF SWITCHING CONTROL BETWEEN DIFFERENT HOST COMPUTERS

(71) Applicant: PIXART IMAGING INC., Hsin-Chu County (TW)

(72) Inventors: Ping-Shun Zeung, Hsin-Chu County (TW); Chung-Han Hsieh, Hsin-Chu County (TW); Pao-Wei Chen, Hsin-Chu County (TW); Kun-Yuan Lin, Hsin-Chu County (TW)

(73) Assignee: PIXART IMAGING INC., Hsin-Chu County (TW)

( * ) Notice: Subject to any disclaimer, the term of this patent is extended or adjusted under 35 U.S.C. 154(b) by 160 days.

This patent is subject to a terminal disclaimer.

(21) Appl. No.: 18/172,325

(22) Filed: Feb. 22, 2023

(65) Prior Publication Data

US 2023/0376131 A1 Nov. 23, 2023

Related U.S. Application Data

(60) Provisional application No. 63/344,053, filed on May 20, 2022.

(51) Int. Cl.
| | |
|---|---|
| *G06F 3/038* | (2013.01) |
| *G06F 3/023* | (2006.01) |
| *G06F 3/0354* | (2013.01) |
| *G06F 3/14* | (2006.01) |
| *G06F 13/10* | (2006.01) |
| *H04M 1/72409* | (2021.01) |

(52) U.S. Cl.
CPC .............. *G06F 3/038* (2013.01); *G06F 3/023* (2013.01); *G06F 3/03543* (2013.01); *G06F 3/03547* (2013.01); *G06F 3/1423* (2013.01); *G06F 13/102* (2013.01); *G06F 2203/0384* (2013.01); *H04M 1/72409* (2021.01)

(58) Field of Classification Search
CPC ...... G06F 3/038; G06F 3/023; G06F 3/03543; G06F 3/03547; G06F 3/1423; G06F 13/102; G06F 2203/0384; H04M 1/72409
See application file for complete search history.

(56) References Cited

U.S. PATENT DOCUMENTS

| | | | |
|---|---|---|---|
| 4,859,995 A | 8/1989 | Hansen et al. | |
| 7,164,886 B2 * | 1/2007 | Mowery | H04W 8/26 342/51 |

(Continued)

*Primary Examiner* — Dmitriy Bolotin
(74) *Attorney, Agent, or Firm* — HAUPTMAN HAM, LLP

(57) ABSTRACT

The present disclosure provides a wireless communication system including a first host computer, a communication dongle, a second host computer and an input device. The communication dongle is connected to the first host computer via a USB interface, connected to the second host computer via a Bluetooth interface, and connected to the input device via a RF interface. The first host computer has first application software for intercepting the operating signal(s) of the input device and transferring, via the communication dongle, to the second host computer to be executed thereby. The first application software also controls the first host computer to ignore the operating signal(s) during the operating signal(s) is being transferred to the second host computer.

8 Claims, 14 Drawing Sheets

(56) References Cited

U.S. PATENT DOCUMENTS

| | | |
|---|---|---|
| 7,207,059 B1 | 4/2007 | Kurian et al. |
| 7,269,183 B2 * | 9/2007 | Morris ................. H04W 76/15 |
| | | 370/535 |
| 7,385,584 B2 | 6/2008 | Segre |
| 7,441,266 B2 | 10/2008 | Kurian et al. |
| 7,629,958 B1 * | 12/2009 | Nicolet ................. G06F 3/038 |
| | | 345/156 |
| 8,150,945 B2 | 4/2012 | Karaoguz et al. |
| 8,744,353 B2 * | 6/2014 | Hsieh ................. G06F 3/03543 |
| | | 710/36 |
| 9,389,706 B2 | 7/2016 | Glazer et al. |
| 9,830,052 B2 | 11/2017 | Seo et al. |
| 9,906,893 B2 * | 2/2018 | Zeung ................. H04W 76/10 |
| 10,191,869 B2 | 1/2019 | Chazot et al. |
| 10,521,373 B2 | 12/2019 | Chazot et al. |
| 10,635,626 B1 * | 4/2020 | Kung ................. G06F 13/4081 |
| 11,782,535 B1 * | 10/2023 | Law ....................... G06F 3/038 |
| | | 345/173 |
| 2002/0065065 A1 * | 5/2002 | Lunsford ............ H04L 63/0492 |
| | | 455/500 |
| 2003/0083013 A1 * | 5/2003 | Mowery ................. H04W 8/26 |
| | | 455/41.1 |
| 2005/0083741 A1 * | 4/2005 | Chang ................. H04W 12/069 |
| | | 365/200 |
| 2006/0025075 A1 * | 2/2006 | Chung ................. H04W 84/18 |
| | | 455/41.2 |
| 2008/0274695 A1 * | 11/2008 | Muth ..................... G06F 3/038 |
| | | 455/41.2 |
| 2008/0311852 A1 * | 12/2008 | Hansen ................. H04W 88/06 |
| | | 455/41.2 |
| 2011/0016466 A1 * | 1/2011 | Liu ......................... G06F 16/10 |
| | | 718/1 |
| 2012/0302169 A1 * | 11/2012 | Lin ....................... G06F 3/0231 |
| | | 455/41.3 |
| 2013/0285911 A1 * | 10/2013 | Nissen ................. G06F 1/3206 |
| | | 345/163 |
| 2014/0108471 A1 * | 4/2014 | Liu ......................... G06F 16/16 |
| | | 707/823 |
| 2014/0125575 A1 * | 5/2014 | Samanta Singhar ... G06F 3/038 |
| | | 345/156 |
| 2014/0342669 A1 * | 11/2014 | Zeung ................. G06F 1/1632 |
| | | 455/557 |
| 2015/0242357 A1 * | 8/2015 | Pancholi ............. G06F 11/3051 |
| | | 710/13 |
| 2016/0196220 A1 * | 7/2016 | Perez ................. G06F 13/102 |
| | | 710/73 |
| 2017/0006415 A1 * | 1/2017 | Song ....................... H04W 4/80 |
| 2017/0351396 A1 * | 12/2017 | Passeri ............. G06F 3/04845 |
| 2017/0351471 A1 * | 12/2017 | Passeri ................. G06F 3/033 |
| 2017/0351472 A1 * | 12/2017 | Passeri ............. G06F 3/04812 |
| 2017/0351629 A1 * | 12/2017 | Passeri ............. G06F 13/4022 |
| 2017/0353549 A1 * | 12/2017 | Passeri ................. G06F 1/1698 |
| 2022/0391158 A1 * | 12/2022 | Lemmens ............. G06F 3/1438 |
| 2023/0133414 A1 * | 5/2023 | Ho ......................... G06F 3/0227 |
| | | 345/163 |
| 2024/0168574 A1 * | 5/2024 | Zeung ............. G06F 3/03547 |

\* cited by examiner

WIRELESS COMMUNICATION SYSTEM CAPABLE OF SWITCHING CONTROL BETWEEN DIFFERENT HOST COMPUTERS

CROSS REFERENCE TO RELATED APPLICATION

The present application claims the priority benefit of U.S. Provisional Application Ser. No. 63/344,053, filed on May 20, 2022, the disclosure of which is hereby incorporated by reference herein in its entirety.

BACKGROUND

1. Field of the Disclosure

The present disclosure generally relates to a wireless communication system and, more particularly, to a wireless communication system that performs the control switching and/or data exchanging between different host computers via a communication dongle.

2. Description of the Related Art

Conventionally, a host device can be connected with multiple peripherals and multiple user input devices via cable lines. However, when numbers of the peripherals and the user input devices are larger, a number of cable lines used for the connection become larger, and thus the assembling complexity and the occupied space are increased.

It is known that an antenna dongle can be used to simultaneously connect multiple peripherals and multiple user input devices to a host device so as to simplify the assembling complexity and to reduce the assembling procedures. However, current antenna dongles are not arranged to perform communication between multiple host devices.

SUMMARY

Accordingly, the present disclosure provides a wireless communication system capable of switching the control authority of an input device between different host computers using a communication dongle.

The present disclosure further provides a wireless communication system capable of exchanging connection information between different host computers using a communication dongle so as to build up a Wi-Fi connection between the different host computers.

The present disclosure further provides a wireless communication system capable of calibrating an origin point during screen mirroring.

The present disclosure further provides a wireless communication system capable of determining output movement (s) according to different lookup tables during screen mirroring.

The present disclosure provides a wireless communication system including a first host computer, a dongle, a first input device and a second host computer. The first host computer is embedded with a first application software. The dongle connects to the first host computer using a USB interface. The first input device has a hotkey, and connects to the dongle using a RF interface to send a first event signal to the first host computer. The second host computer connects to the dongle using a Bluetooth interface. After receiving a pressed signal of the hotkey via the dongle, the first application software intercepts the first event signal from the first input device and transfers the intercepted first event signal to the second host computer via the dongle to cause the first input device to control operation of the second host computer.

The present disclosure further provides a wireless communication system including a first host computer, a dongle, a mouse device and a second host computer. The first host computer has a first screen and is embedded with a first application software. The dongle connects to the first host computer using a USB interface. The mouse device connects to the dongle using a RF interface to send a first movement signal to the first host computer. The second host computer has a second screen and is embedded with a second application software, and connects to the dongle using a Bluetooth interface. While detecting a first cursor on the first screen is moved to a first predetermined edge thereof according to the first movement signal, the first application software intercepts a first event signal from the mouse device and transfers the intercepted first event signal to the second host computer via the dongle to cause the mouse device to control operation of the second host computer.

The present disclosure further provides a wireless communication system including a first host computer, a dongle, a mouse device and a smartphone. The first host computer has a first screen and being embedded with a first application software. The dongle connects to the first host computer using a USB interface. The mouse device connects to the dongle using a RF interface to send a first movement signal to the first host computer. The smartphone is embedded with a second application software, and connects to the dongle using a Bluetooth interface. When the wireless communication system performs screen mirroring to project the smartphone to the first screen and the first application software detects a cursor on the first screen enters a mirroring range of the projected smartphone, the first application software intercepts a first event signal from the mouse device and transfers the intercepted first event signal to the smartphone via the dongle to cause the mouse device to control operation of the smartphone.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

One objective of the present disclosure is to provide a communication dongle, e.g., a USB dongle, which can perform the data exchanging and/or the control switching of input device(s) between multiple hosts (e.g., computer devices). However, it is possible to replace the USB dongle of the present disclosure by a USB hub, a USB docking station or the like without particular limitations.

Figure 1:
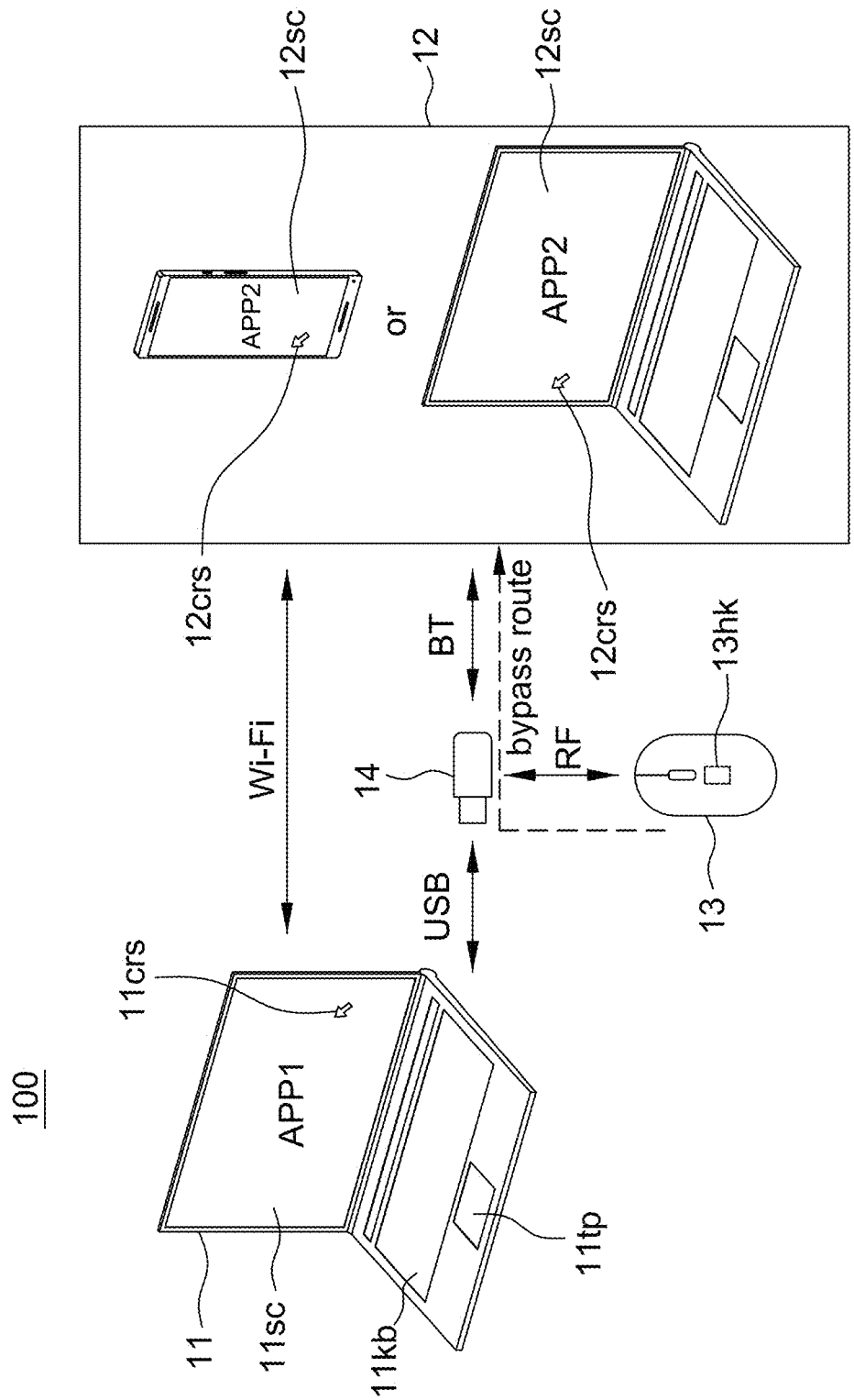
FIG. 1 is a connecting schematic diagram of a wireless communication system according to one embodiment of the present disclosure.

Please refer to FIG. 1, it is a connecting schematic diagram of a wireless communication system 100 according to one embodiment of the present disclosure. The wireless communication system 100 includes a first host computer 11, a communication dongle (abbreviated as dongle) 14, an input device 13 and a second host computer 12. The first host computer 11 is a computer device having a first screen 11sc and embedded with a first application software APP1, e.g., a notebook computer, a tablet computer, a work station or a desktop computer, but not limited thereto. The input device 13 is, for example, a mouse device or a keyboard, but not limited thereto. The second host computer 12 is preferably a portable device having a second screen 12sc and embedded with a second application software APP2, e.g., a smartphone, a tablet computer or a notebook computer, but not limited thereto.

The APP1 and APP2 are respectively stored/recorded in the first host computer 11 and the second host computer 12 before or after shipment, e.g., downloaded into the first host computer 11 and the second host computer 12 from the internet, from the portable storage equipment or from the dongle 14 without particular limitations as long as the first host computer 11 and the second host computer 12 are able to run the APP1 and APP 2, respectively.

In the present disclosure, the dongle 14 is used as a bridge between the first host computer 11 and the second host computer 12, and is also used as a bridge between the APP1 and APP2.

The dongle 14 is connected to the first host computer 11 using a USB interface, e.g., the connection is completed by inserting a connecting part of the dongle 14 into a USB slot of the first host computer 11. The connection method is known to the art and not a main objective of the present disclosure, and thus details thereof are not described herein.

The input device (taking a mouse device as an example in FIG. 1) 13 is connected to the dongle 14 using a 2.4 GHz (not limited to 2.4 GHz) RF interface to send a first event signal to the first host computer 11, wherein the method of connecting two devices using a RF interface is known to the art and not a main objective of the present disclosure, and thus details thereof are not described herein. The first event signal includes, for example, the object dragging signal, movement signal, mouse click signal, mouse roller signal or the like. It is appreciated that if the input device 13 is another type of device, e.g., a keyboard, the first event signal is a pressed signal of the key(s) of the keyboard. That is, the first event signal is a signal generated by operating the input device 13.

Figure 2:
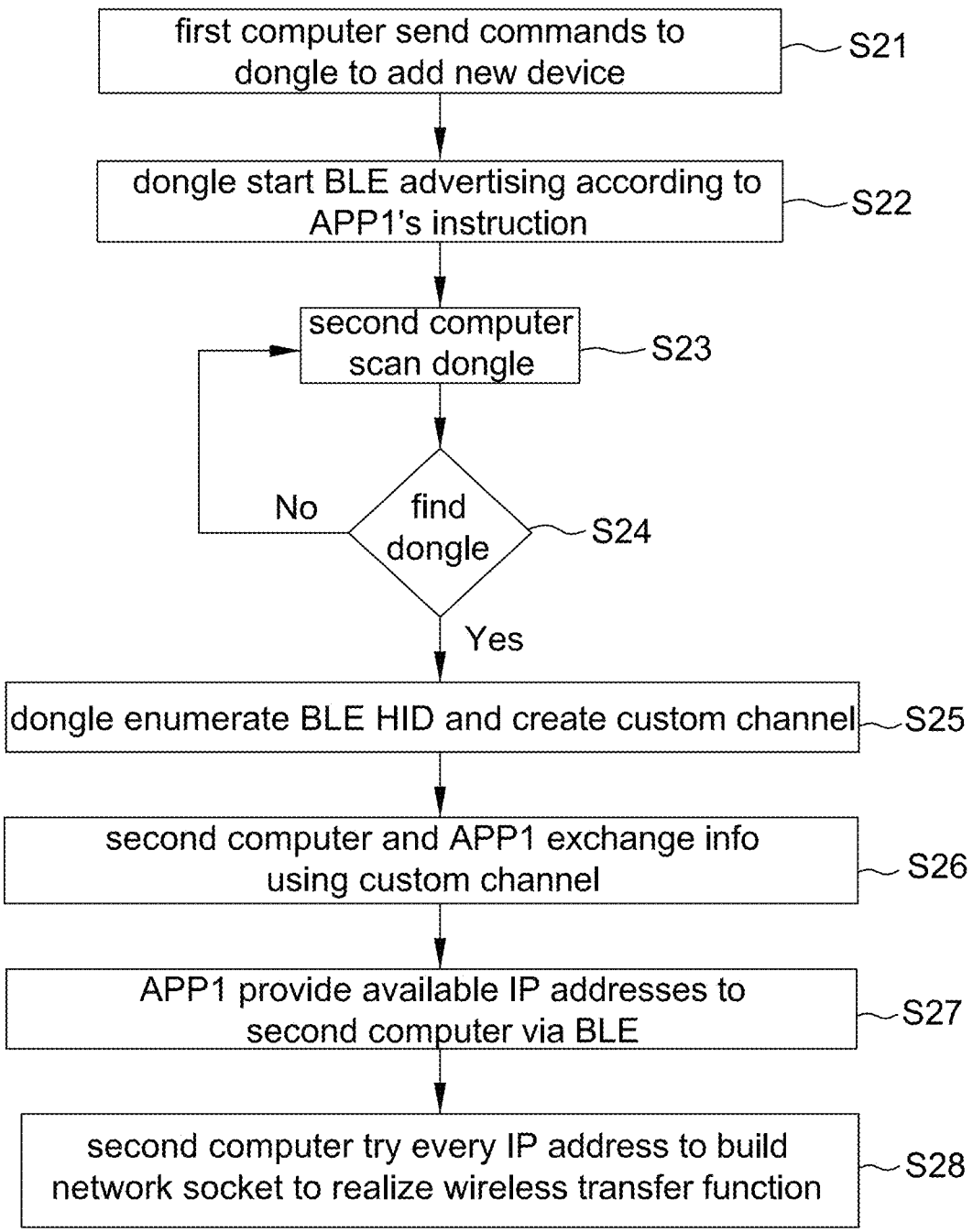
FIG. 2 is a flow chart of performing the Bluetooth pairing by a wireless communication system according to one embodiment of the present disclosure.
Figure 3:
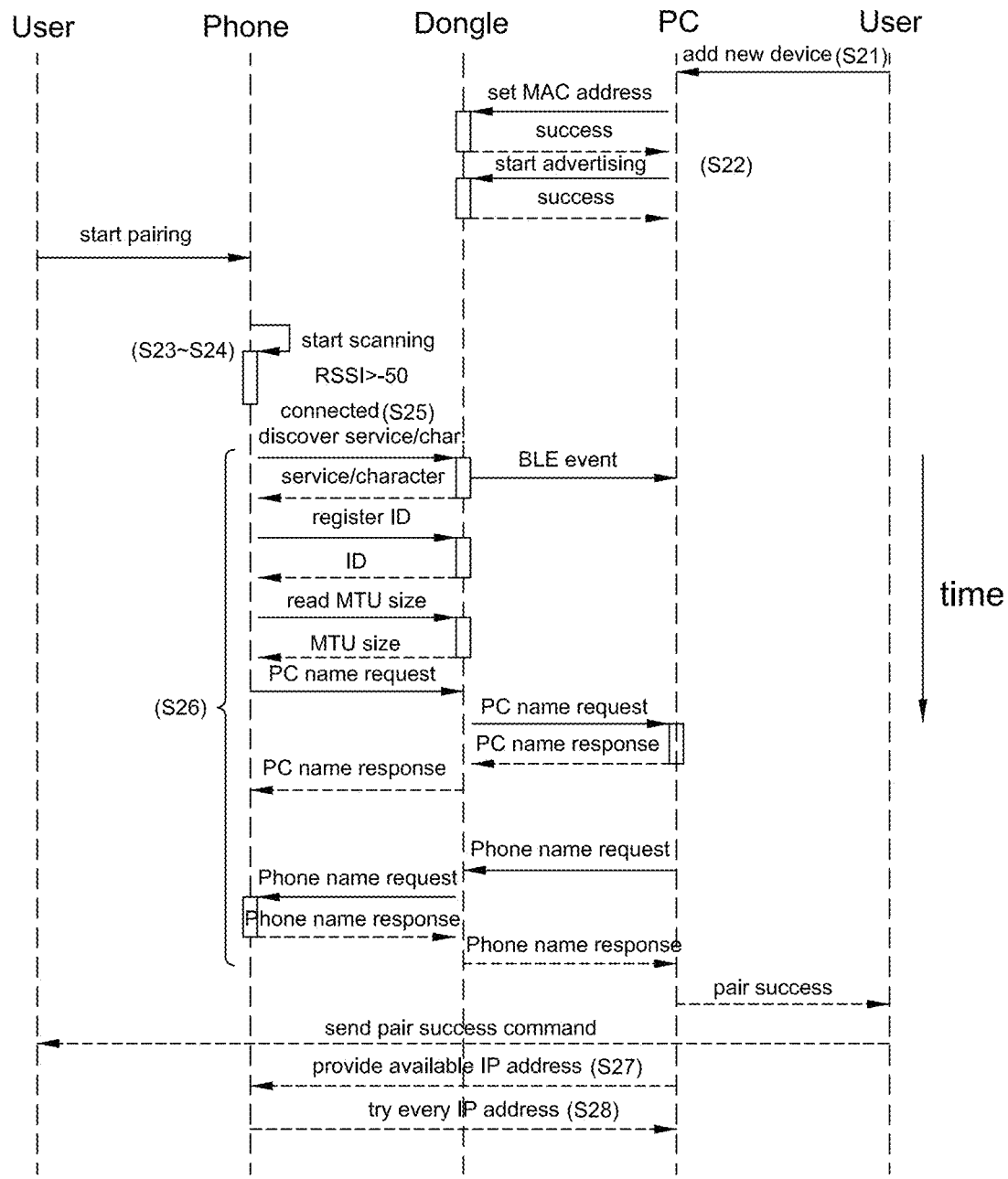
FIG. 3 is timing diagram of performing the pairing between host computers by a wireless communication system according to one embodiment of the present disclosure.

The second host computer 12 is connected to the dongle 14 using a Bluetooth interface (preferably Bluetooth Low Energy, BLE interface). Please refer to FIGS. 2 and 3, FIG. 2 is a flow chart of performing the Bluetooth pairing by a wireless communication system 100 according to one embodiment of the present disclosure; and FIG. 3 is timing diagram of performing the Bluetooth pairing between host computers by a wireless communication system 100 according to one embodiment of the present disclosure for building up a Bluetooth connection (shown as BT in FIG. 1) between the second host computer (taking a smartphone as an example) 12 and the dongle 14.

Step S21: First of all, a user executes a function of the APP1 (e.g., clicking or pressing an icon associated with the APP1 on the first screen 11sc) of the first host computer 11 to add a new paired device.

Step S22: Next, the dongle 14 performs advertising according to an instruction of the APP1. The dongle 14 includes a Bluetooth chip to perform the advertising. Advertising using a Bluetooth chip is known to the art, and thus details thereof are not described herein.

Step S23: The user operates the second host computer 12 to start pairing to cause the second host computer 12 to scan the dongle 14. The second host computer 12 starts scanning and tries to build a connection with the dongle 14. The second host computer 12 also includes a Bluetooth chip to perform the scanning.

Step S24: After the dongle 14 is found by the second host computer 12, a Step S25 is entered. Otherwise, the scanning is continuous for a predetermined time interval, e.g., 10 to 30 seconds, but not limited to.

Step S25: The dongle 14 enumerates a BLE human input device (HID) and creates a custom communication channel with the second host computer 12. In one aspect, the second host computer 2 will connect with the dongle 14 only when the received RSSI (received signal strength indicator) from the dongle 14 is larger than −50 db (RSSI>−50 db) indicating that the dongle 14 is close enough.

Step S26: The APP1 of the first host computer 11 exchanges information with the second host computer 12 through the dongle 14 and the custom communication channel, said information including a phone name, a type of phone operation system (OS), a computer (i.e. first host computer 11) name, universal unique identification (UUID) and other information required in the pairing.

After the pairing is successful, messages regarding success of pairing are respectively shown on the first host computer 11 and the second computer 12 to inform the user.

Step S27: Next, the APP1 of the first host computer 11 provides available IP addresses via the Bluetooth connection to the second host computer 12.

Step S28: Finally, the APP2 of the second host computer 12 tries every available IP address in order to build up a network socket to realize the wireless transfer function.

After the above steps, the dongle 14 receives the first event signal from the input device 13 via the RF interface to control the first host computer 11, and connects to the second host computer 12 via the Bluetooth interface. The dongle 14 is used as an input device of the second host computer 12, and the second host computer 12 is controlled by the dongle 14 as long as event/control signals are received from the dongle 14.

In one aspect, the input device (or called first input device) 13 has a hotkey 13hk for switching the input device 13 to control the first host computer 11 or the second host computer 12. In one aspect, the hotkey 13hk is exclusive to switching a controlled target, i.e. the first host computer 11 or the second host computer 12 herein, of the input device 13.

Please refer to FIG. 1 again, when the dongle 14 is connected to the first host computer 11 via the USB connection and connected to the input device 13 via the RF connection, the input device 13 is used to control operation of the first host computer 11 (default arrangement), e.g., moving a cursor 11crs, clicking on an icon, dragging an object (e.g., an icon) or other corresponding operations, which are determined according to functions of the input device 13.

In this aspect, after receiving a pressed signal (possible being other signals including a rotating signal, switching signal depending on a type of the hotkey 13hk), the APP1 starts to intercept a first event signal (e.g., a movement signal, a click signal, a roller signal and an object dragging signal) from the input device 13 via the dongle 14 and to transfer the intercepted first event signal to the second host computer 12 via the dongle 14 such that the input device 13 controls operations of the second host computer 12.

In this aspect, said "intercept" refers to forbidding an operation system (OS) of the first host computer 11 to execute operations reacting to the controls from the input device 13 correspondingly.

For example, the APP1 controls the first host computer 11 not to operate corresponding to the first event signal, e.g., the OS of the first host computer 11 ignoring the first event signal, or the dongle 14 will not make the first event signal be sent to the OS of the first host computer 11 at all. For example, the first event signal is not handled by the APP1 and the first event signal is bypassed by the dongle 14 to the second host computer 12 shown as a bypass route in FIG. 1. In other words, by operating the hotkey 13hk, the controlled target of the input device 13 is switched from the first host computer 11 to the second host computer 12.

During the first event signal from the input device 13 is being sent to the second host computer 12 via the dongle 14, i.e. an interval during which the input device 13 controlling the second host computer 12, the first event signal is arranged to be transferred to the first host computer 11 again without transferring to the second host computer 12 via the dongle 14 by operating (including pressing, rotating and/or switching) the hotkey 13hk again, i.e. the controlled target of the input device 13 is switched from the second host computer 12 back to the first host computer 11.

In another aspect, the hotkey 13hk is arranged to control the second host computer 12 to show recently executed APPs on the second screen 12sc, and the second host computer 12 is arranged to select one of the recently executed APPs according to a direction signal (e.g., a mouse roller signal, a movement signal of a touchpad or a direction key signal of a keyboard, but not limited to) from the input device 13. In another further aspect, the hotkey 13hk is arranged to change/select an input method corresponding to different languages. In a further aspect, the hotkey 13hk is arranged to control the second host computer 12 to go to a home desktop when the second host computer 12 is a smartphone. In an alternative aspect, the hotkey 13hk is arranged to bring up an on-screen keyboard of the second host computer 12 when the second host computer 12 is a smartphone. In a further alternative aspect, the hotkey 13hk is arranged to perform the cursor position calibration, e.g., referring to FIGS. 7A to 7C and corresponding descriptions below.

In the case that the hotkey 13hk is not used to switch back the controlled target of the input device 13 (e.g., hotkey 13hk for performing other functions mentioned above), and the first host computer 11 is a computer device (e.g., notebook computer) having a touchpad (e.g., 11tp), the APP1 is used to control the dongle 14, while receiving an operation signal of the touchpad 11tp, to provide the first event signal back to the first host computer 11 without providing to the second host computer 12. That is, the controlled target of the input device 13 is switched back by operating the touchpad 11tp.

In the preset disclosure, the dongle 14 further transfers event signals of other input devices (e.g., keyboard, joystick) as well as the above first event signal all to different host computers. For example, the wireless communication system 100 further includes a second input device connected to the first host computer 11 not via the dongle 14 (e.g., using a USB interface or Bluetooth interface) or directly embedded in the first host computer 11 (e.g., embedded keyboard 11kb or touchpad 11tp). After receiving an operation signal of the hotkey 13hk via the dongle 14, the APP1 further intercepts a second event signal from the second input device and transfers the intercepted second event signal to the second host computer 12 via the dongle 14. During the intercepted second event signal is being transferred to the second host computer 12, the APP1 controls the first host computer 11 not to operate corresponding to the second event signal. Similarly, the second event signal is determined according to functions of the second input device (e.g. keyboard 11kb or touchpad 11tp).

In other words, by operating the hotkey 13hk, the controlled target of multiple input devices connecting to the first host computer 11 are all switched to the second host computer 12 by APP1 and through the dongle 14. As mentioned above, it is able to switch the controlled target of all the multiple input devices back to the first host computer 11 by operating the hotkey 13hk again or by operating the touchpad 11tp. However, in the case that the controlled target of the touchpad 11tp is switched to the second host computer 12 by operating the hotkey 13*hk*, the touchpad 11*tp* is not used to perform the switching of the controlled target. If the input device includes different hotkeys, it is possible to appoint each hotkey to switch the controlled target of one input device.

According to the arrangement of the present disclosure, a user is able to control more than one host computers using one set of input device(s) and to easily switch the control authority therebetween such that the user experience is improved. In the above embodiment, if the input device is a keyboard, the hotkey is a predetermined key on the keyboard.

In an aspect that another keyboard is connected (wired or wirelessly) to the second host computer 12, the controlled target of said another keyboard is switched, via the APP2 and Bluetooth connection, to the first host computer 11 by operating a predetermined key, e.g., on the input device 13 or said another keyboard. That is, using the dongle 14, an input device originally used to control the first host computer 11 can be switched to control the second host computer 12, and an input device originally used to control the second host computer 12 can be switched to control the first host computer 11.

Please refer to FIG. 1 again, another embodiment of switching the controlled target of the input device 13 is described below.

In some aspects, the first screen 11*sc* shows a first cursor 11*crs*, and the second screen 12*sc* shows a second cursor 12*crs* for being controlled by the input device 13. The method of controlling a cursor using an input device is known to the art, and thus details thereof are not described herein.

When detecting the first cursor 11*crs* locates at (i.e. moved thereto according to the movement signal of the input device 13) a first predetermined edge (e.g., right edge herein, but not limited to) of the first screen 11*sc*, the APP1 intercepts a first event signal from the mouse device (i.e. the input device 13) and transfers the intercepted first event signal to the second host computer 12 via the dongle 14 such that the mouse device 13 is able to control operation of the second host computer 12. Meanwhile, after detecting the first cursor 11*crs* located at the first predetermined edge of the first screen 11*sc* and the second host computer 12 is being controlled, the APP1 further controls the first host computer 11 not to operate corresponding to the first event signal as mentioned above.

In this embodiment, the switching of the controlled target of the input device is automatically triggered by a location of the first cursor 11*crs*. In other words, in this embodiment, before intercepting the first event signal from the mouse device 13 and transferring the intercepted first event signal to the second host computer 12 via the dongle 14, the APP1 does not need to send a switch command to the second host computer 12 via the dongle 14 to perform switching of the controlled target. As mentioned above, because the dongle 14 is enumerated as an input device of the second host computer 12, the second host computer 12 operates correspondingly as long as the first event signal is received thereby even without knowing the operation of the first host computer 11.

After intercepting a first movement signal from the mouse device 13 and transferring the intercepted first movement signal to the second host computer 12 via the dongle 14, i.e. the controlled target of the mouse device 13 being switched to the second host computer 12, the second screen 12*sc* shows motion of the second cursor 12*crs* corresponding to the intercepted first movement signal (or called second movement signal) of the mouse device 13, e.g., controlled by the operation system of the second host computer 12. In the meantime, the APP2 monitors operation of the operation system of the second host computer 12. When detecting the second cursor 12*crs* locates at (i.e. moved thereto according to the second movement signal of the input device 13) a second predetermined edge (e.g., left edge herein, but not limited to) of the second screen 12*sc*, the APP2 sends a switch command to the first host computer 11 via the Bluetooth connection and the dongle 14 to cause the APP1 to stop intercepting and transferring the first event signal from the mouse device 13. In this aspect, the switch command is sent only from APP2 but is not necessary sent from APP1.

In the present disclosure, the input device 13 does not know (and not necessary to know) whether the controlled target thereof is switched or not when the hotkey 13*hk* is operated. The input device 13 only sends a signal indicating that the hotkey 13*hk* is operated, and is not arranged to know (receiving corresponding signals) the operation be performed corresponding to said signal.

As mentioned above, the wireless communication system 100 further includes another input device (e.g., keyboard or joystick) connected to the first host computer 11 not via the dongle 14 or said another input device directly embedded in the first host computer 11. In an interval that the APP1 is intercepting the first event signal from the mouse device 13 and transferring the intercepted first event signal to the second host computer 12 via the dongle 14, the APP1 further intercepts a second event signal from said another input device and transfers the intercepted second event signal to the second host computer 12 via the dongle 14. In the meantime, the APP1 controls the first host computer 11 not to operate corresponding to the second event signal, which is similar to intercepting and transferring the first event signal described above and thus details thereof are not repeated herein.

Figure 4:
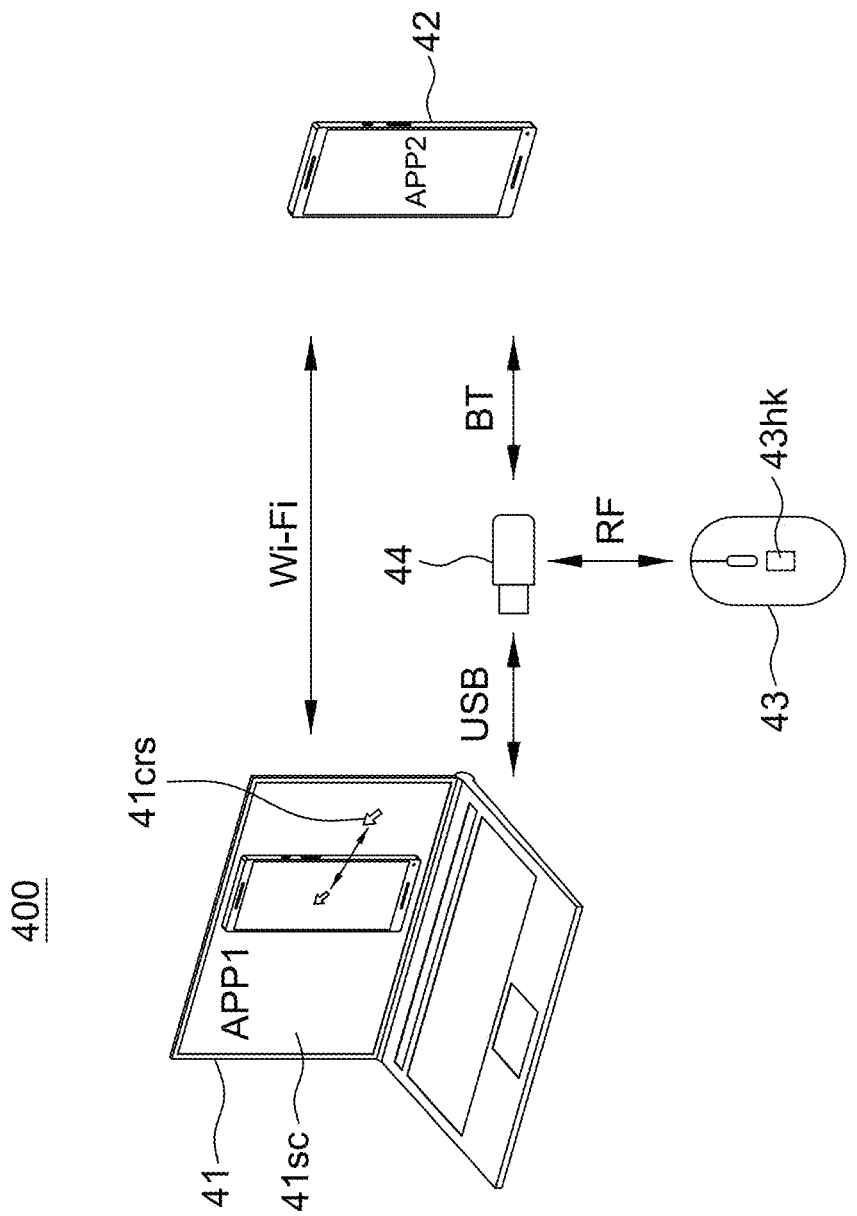
FIG. 4 is an operational schematic diagram of performing the screen mirroring by a wireless communication system according to one embodiment of the present disclosure.

Please refer to FIG. 4, another embodiment of switching the controlled target of the input device is described below. FIG. 4 is an operational schematic diagram of performing the screen mirroring by a wireless communication system 400 according to one embodiment of the present disclosure.

The wireless communication system 400 of this embodiment includes a first host computer (shows as a notebook computer as an example) 41, a second host computer (shows as a smartphone as an example) 42, an input device (shown as a mouse device as an example) 43 and a communication dongle 44. The wireless communication system 400 of this embodiment is adapted to perform the screen mirroring to project the smartphone 42 onto a first screen 41*sc* of the first host computer 41.

When detecting a cursor 41*crs* entering a mirroring range (i.e. a region showing the smartphone 42) of the smartphone 42 in the first screen 41*sc*, the APP1 intercepts a first event signal from the mouse device 43 and transfers the intercepted first event signal to the smartphone 42 via the dongle 44 such that the mouse device 43 is able to control operation of the smartphone 42. In other words, the difference of this embodiment from the above embodiments is that in the above embodiments the controlled target of an input device is switched by operating a hotkey or identifying whether a cursor is at a screen edge; whereas in this embodiment the APP1 determines whether to switch the controlled target of the mouse device 43 by identifying whether a position of a cursor 41*crs* is within the mirroring range of the first screen 41*sc*. Different from the above embodiment which identifies whether the position of cursor 11*crs* is at an edge of the screen 11*sc* or 12*sc*, in this embodiment APP1 identifies whether the position of cursor 41*crs* is within the mirroring range or not. Optionally, during screen mirroring, users still can directly use the hotkey 43*hk* to switch the first event signal to control smartphone 42, i.e. switching by operating the hotkey 43*hk* or identifying the cursor position by APP1.

In one aspect, the first event signal includes a mouse click signal and a mouse roller signal, but does not include a movement signal. For example, when receiving a movement signal from the mouse device 43 via the dongle 44, the APP1 controls the dongle 44 not to transfer the movement signal (without a click) to the smartphone 42 but only to change a position of the cursor 41*crs* on the first screen 41*sc*. In other words, the movement signal is still provided to the operation system of the notebook computer 41; whereas the mouse click signal and the mouse roller signal are provided to the operation system of the smartphone 42. For example, a coordinate of said mouse click is obtained by the APP1 calculating a distance between a clicked position and an original point, and the distance is sent to the smartphone 42 for the APP2 to check a lookup table mentioned below, e.g., in the embodiment associated with FIG. 9.

When detecting the cursor 41*crs* leaving the mirroring range of the smartphone 42 on the first screen 41*sc*, the APP1 stops intercepting and transferring the first event signal from the mouse device 43. That is, the controlled target of the mouse device 43 is switched back to the notebook computer 41.

In addition, after the cursor 41*crs* enters the mirroring range of the smartphone 42 on the first screen 41*sc* and when the APP1 detects the first event signal is an object dragging (e.g., using the cursor 41*crs* selecting an icon of the smartphone 42 and moving the mouse device 42 in order to move the icon within the mirroring range), the APP1 sends a switch command to the dongle 44 to cause the dongle 44 to directly transfer a dragging signal associated with the object dragging to the smartphone 42 without passing the notebook computer 41. In this aspect, the movement signal is also transferred to the smartphone 42 to drag an object on the smartphone 42.

Compared with the conventional method in which the dongle 44 sends the dragging signal to the APP1 at first and then sends the dragging signal to the smartphone 42 (i.e. the dongle 44 sending the dragging signal sequentially to the APP1 and the smartphone 42), the present disclosure can effectively ease latency in dragging operation and improve the user experience.

As mentioned above, the wireless communication system 400 further includes a second input device (e.g., keyboard or joystick) connected to the first host computer 41 not via the dongle 44 or directly embedded in the first host computer 41. In an interval during which the APP1 is intercepting the first event signal from the mouse device 43 and transferring the intercepted first event signal to the smartphone 42 via the dongle 44, the APP1 further intercepts a second event signal from the second input device and transfers the intercepted second event signal to the smartphone 42 via the dongle 44. In the meantime, the APP1 controls the first host computer 41 not to operate corresponding to the second event signal, which has been described above and thus details thereof are not repeated herein.

The methods of switching the controlled target by a hotkey or a cursor position mentioned above are combinable to form another embodiment.

In the present disclosure, since the first host computer receives information regarding a type of operation system of the second host computer (e.g., smartphone) after the Bluetooth pairing (e.g., shown in FIGS. 2 and 3), the APP1 of the first host computer is able to set customized setting or application corresponding to different operation systems (e.g., including current iOS and Android). For example, when the input device 13 has a hotkey 13*hk* as shown in FIG. 1, the APP1 performs different actions corresponding to different operation systems upon the hotkey 13*hk* being operated.

Please refer to FIG. 1 again, after the dongle 14 is connected to the first host computer 11 with the USB interface and connected to the second host computer 12 with the Bluetooth interface, the dongle 14 is further served as a bridge between the APP1 of the first host computer 11 and the APP2 of the second host computer 12 to build up a communication channel therebetween. For example, the second host computer 12 obtains the IP address of the first host computer 11 via the dongle 14 to build up a Wi-Fi connection between the first host computer 11 and the second host computer 12 so as to obtain higher transmission throughput.

For example, system levels of the first host computer 11 and the second host computer 12 are allocated with IP addresses by a local network where the first host computer 11 and the second host computer 12 are located. The local network is provided by a Wi-Fi router (not necessary connected to internet), by a hotspot of a smartphone (i.e. the second host computer 12), by an access point (AP) mode of a computer (i.e. the first host computer 11) or by a Wi-Fi direct of an Android phone (i.e. the second host computer 12), but not limited thereto. Next, application layers of the first host computer 11 and the second host computer 12 exchange the allocated IP addresses via the Bluetooth connection (shown as BT) to build up the Wi-Fi connection (shown as Wi-Fi) between the first host computer 11 and the second host computer 12. Because the IP addresses are not transferred via internet, the connection security is significantly increased.

Figure 5:
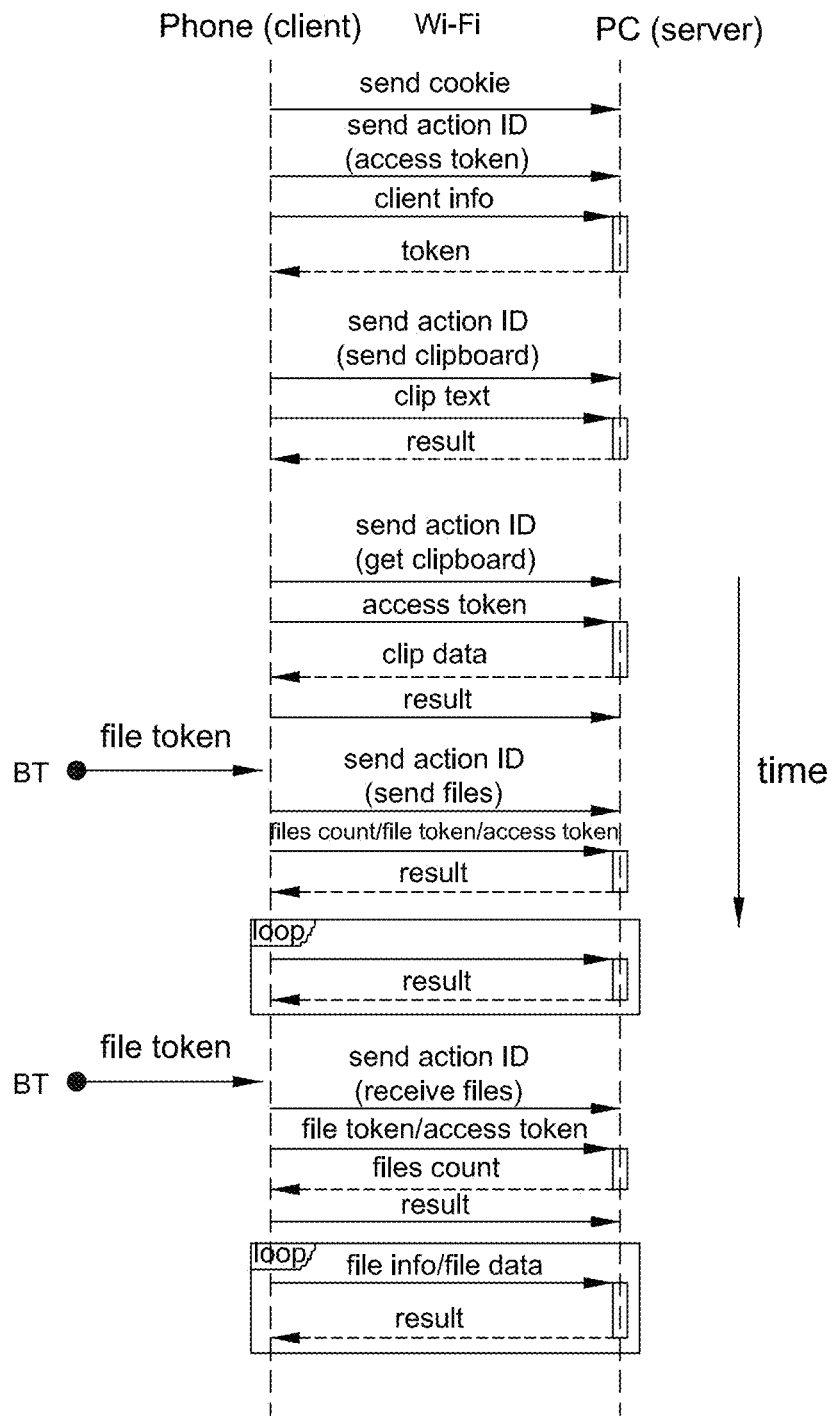
FIG. 5 is a timing diagram of performing the file data transmission by a wireless communication system according to one embodiment of the present disclosure.

If it is desired to transfer encrypted files between the first host computer 11 and the second host computer 12 via the Wi-Fi connection, the file token is arranged to be transferred via the Bluetooth connection, shown as BT in FIG. 5 in which the first host computer 11 is shown as PC and the second host computer 12 is shown as phone (i.e. the smartphone mentioned above) for illustration purposes. FIG. 5 shows that the file token is transferred via the BT connection, but other data are transferred via the Wi-Fi connection. Because the BT connection is constructed by a standard pairing process, and thus it is already an encrypted channel. The present disclosure uses the encrypted channel to transfer the file token without passing internet, the security of file transmission is effectively increased.

In addition, if it is desired to further increase the security of file transmission, the unlocking function (e.g., unlocked by fingerprint, face recognition, password) of the phone can be used to permit the file transmission before the file transmission is started.

In one aspect, after the Wi-Fi connection between the first host computer 11 and the second host computer 12 is completed, the first host computer 11 is arranged to show a directory in File Explorer of the first host computer 11 to represent the second host computer 12, and the APP2 sends a thumbnail of a photo/video in the second host computer 12 to the aforementioned directory of first host computer 11 via the Wi-Fi connection such that it is known the second host computer 12 is Wi-Fi connected to the first host computer 11. When the second host computer 12 is disconnected from the first host computer 11, the aforementioned directory will be unmounted or be indicated as off-line. Because data is not transmitted via a USB cable line between the phone and the PC, which is used by conventional method, the present disclosure can prevent plugging and unplugging a cable line each time the data transmission is performed. When a user drags the thumbnail on the first screen 11*sc* of the first host computer 11 to a destination directory, the actual transmission of photos and videos from the second host computer 12 to the first host computer 11 via the Wi-Fi connection begins.

The operation system of some host computers (e.g., iOS) will close an APP when the APP enters background. Therefore, when a user uses the Wi-Fi connection to transmit a large file, the transmission may be ceased when the APP is closed or terminated by the host computer system such that the transmission is not completed or an error occurs. To avoid this issue, the phone (more specifically the APP2) is arranged to send keep alive packets via the Bluetooth connection to the dongle 14 to make sure the APP2 is not closed by the operation system of the phone even though background is entered. In addition, the APP1 is able to know whether the second host computer 12 operates normally according to the information from the dongle 14 which receives keep alive packets from the second host computer 12.

In another aspect, the dongle 14 is arranged to transmit keep alive packets via the USB interface (different from those sent by the APP2 which is sent via Bluetooth connection) to the APP1 to let the APP1 know whether the USB connection enters a suspend mode or not.

In addition, the wireless communication system of the present disclosure further performs applications below.

When a Wi-Fi connection is terminated, e.g., the phone 12 leaving a range of the BT connection with the dongle 14, the dongle 14 will inform APP1 to automatically lock the first host computer 11, i.e. the first host computer 11 not operable before it is unlocked. Next, when the phone 12 enters the range of the BT connection again and re-builds the BT connection with the dongle 14, and when the phone 12 runs an unlock function (e.g., password unlock or bio-recognition), the phone 12 will trigger the dongle 14 to inform APP1 for unlocking the first host computer 11, or the dongle 14 (been enumerated as USB keyboard) can automatically fill in the password to unlock first host computer 11.

Figure 6A:
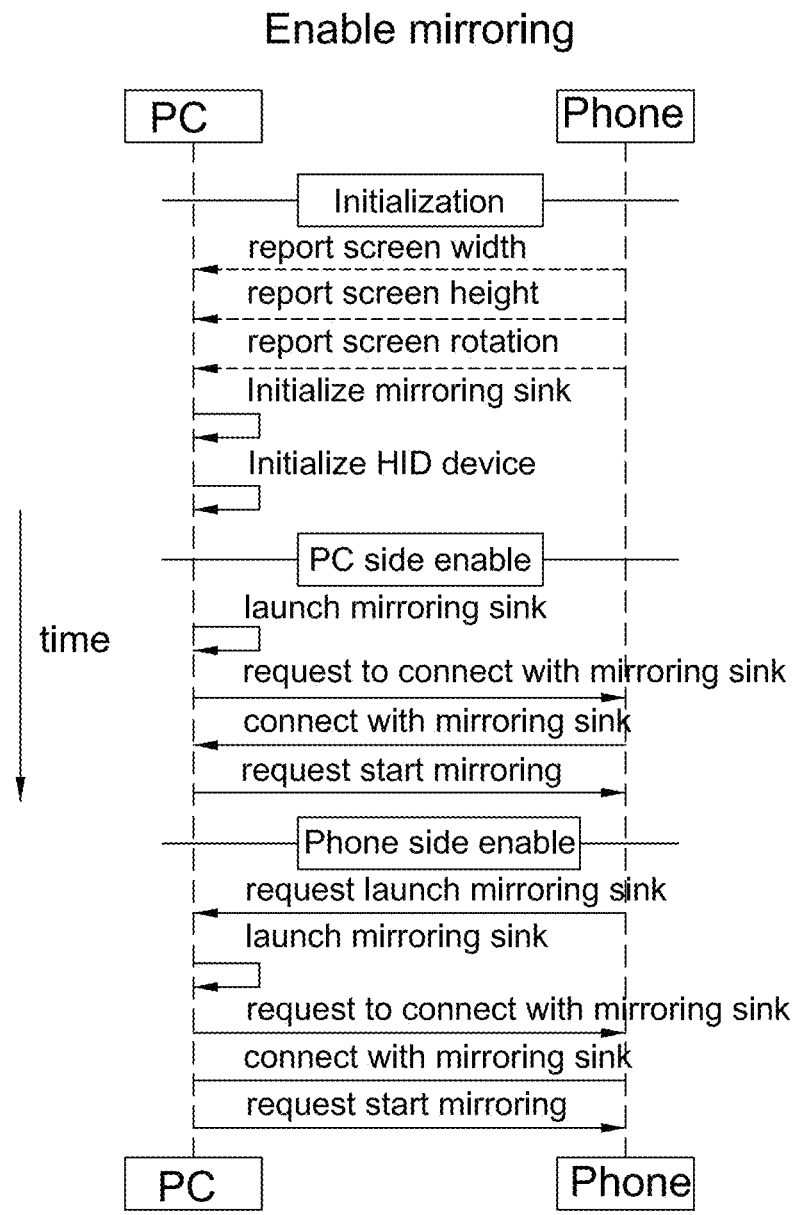
FIG. 6A is a timing diagram of enabling the screen mirroring by a wireless communication system according to one embodiment of the present disclosure.
Figure 6B:
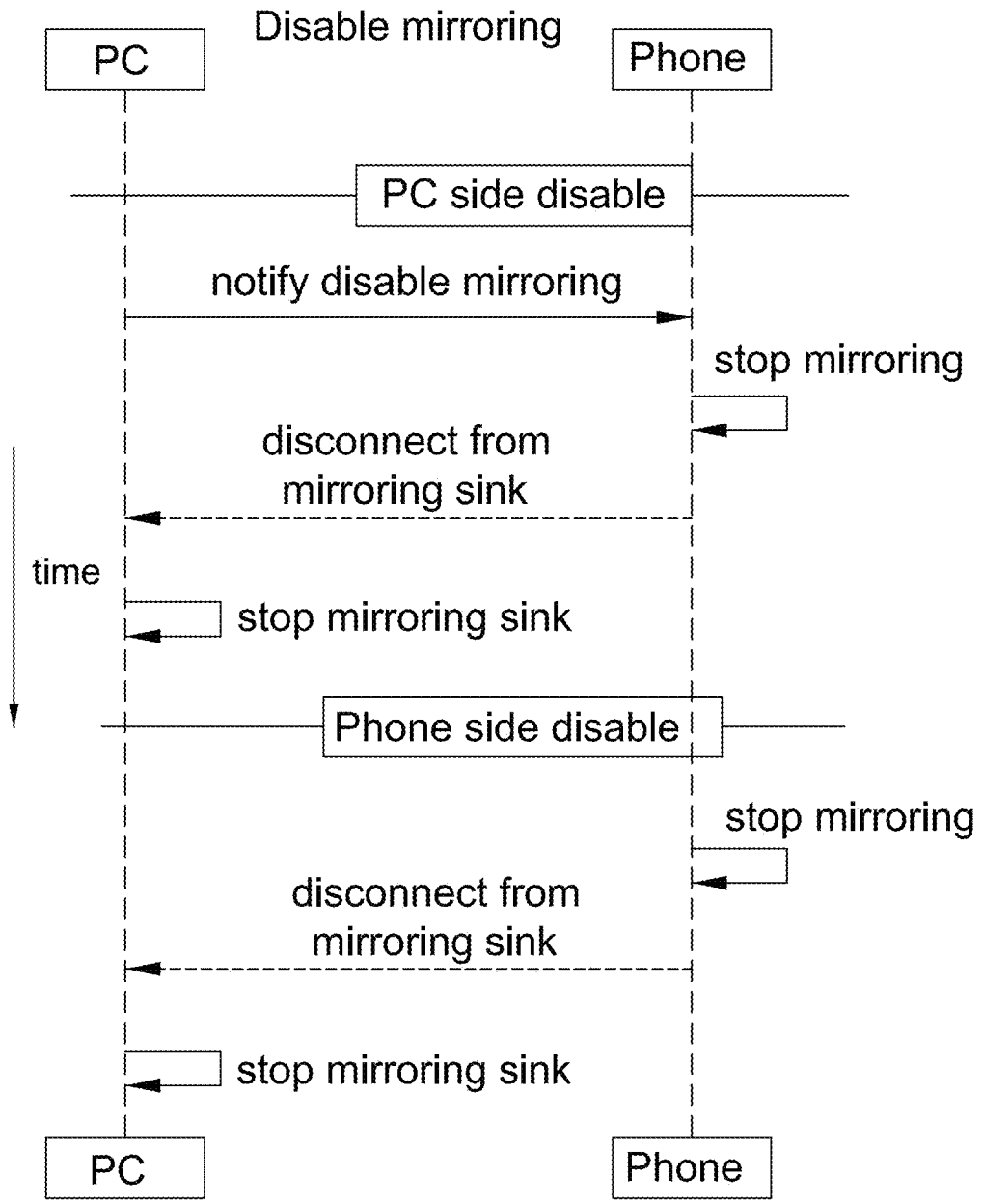
FIG. 6B is a timing diagram of disabling the screen mirroring by a wireless communication system according to one embodiment of the present disclosure.

After a Wi-Fi connection is completed, the Wi-Fi connection is used to perform enabling/disabling screen mirroring. For example, FIG. 6A shows data exchanging via the Wi-Fi connection for enabling the screen mirroring; and FIG. 6B shows data exchanging via the Wi-Fi connection for disabling the screen mirroring. In FIGS. 6A and 6B, a PC is served as the first host computer 11 and a phone is served as the second host computer 12 for illustration purposes. By forming a Wi-Fi connection between the first host computer 11 and the second host computer 12, the mirroring function is executed via the Wi-Fi connection. In this embodiment, the enabling/disabling screen mirroring is initiated from the first host computer 11 or the second host computer 12.

Figure 7A:
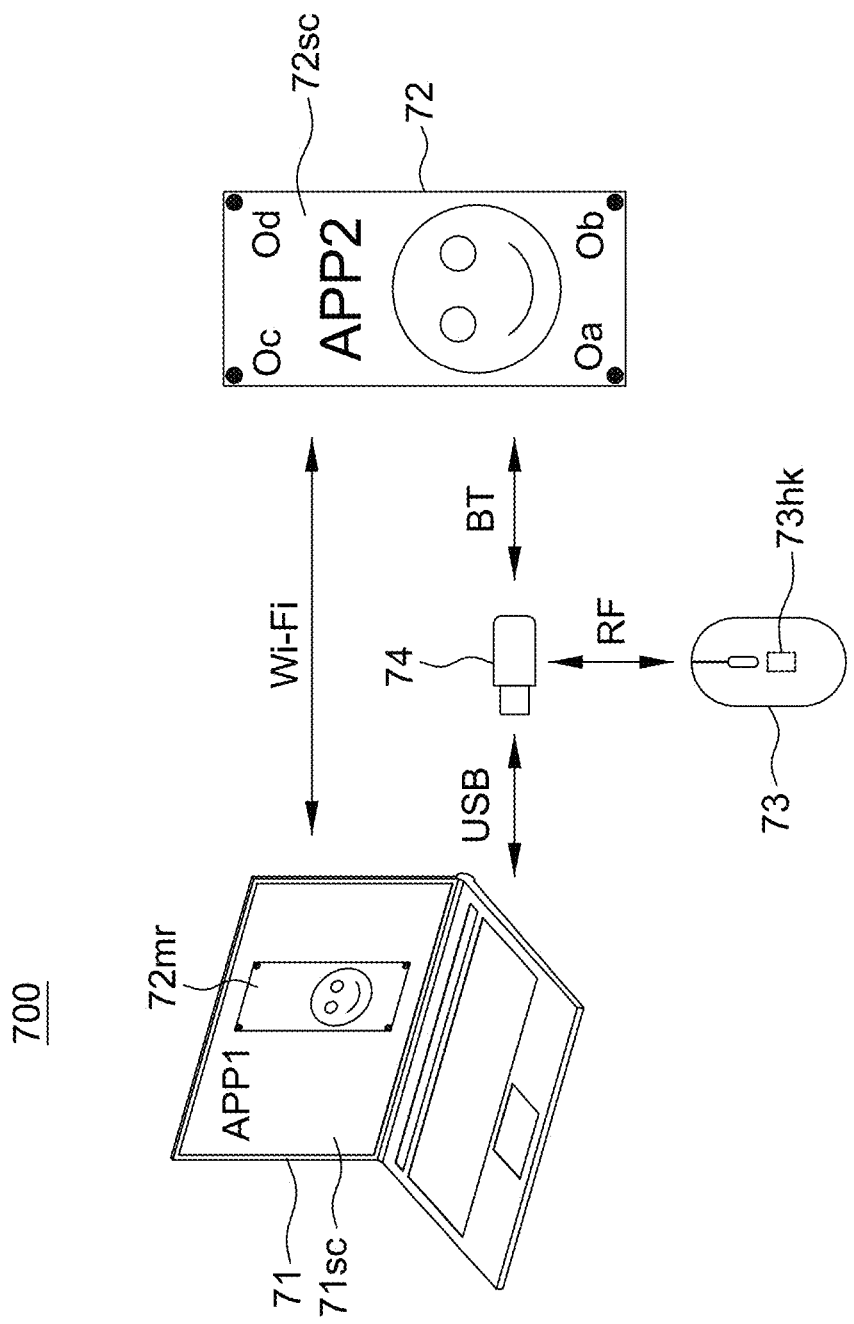
FIG. 7A is a schematic diagram of performing the screen mirroring in a longitudinal direction by a wireless communication system according to one embodiment of the present disclosure.
Figure 7B:
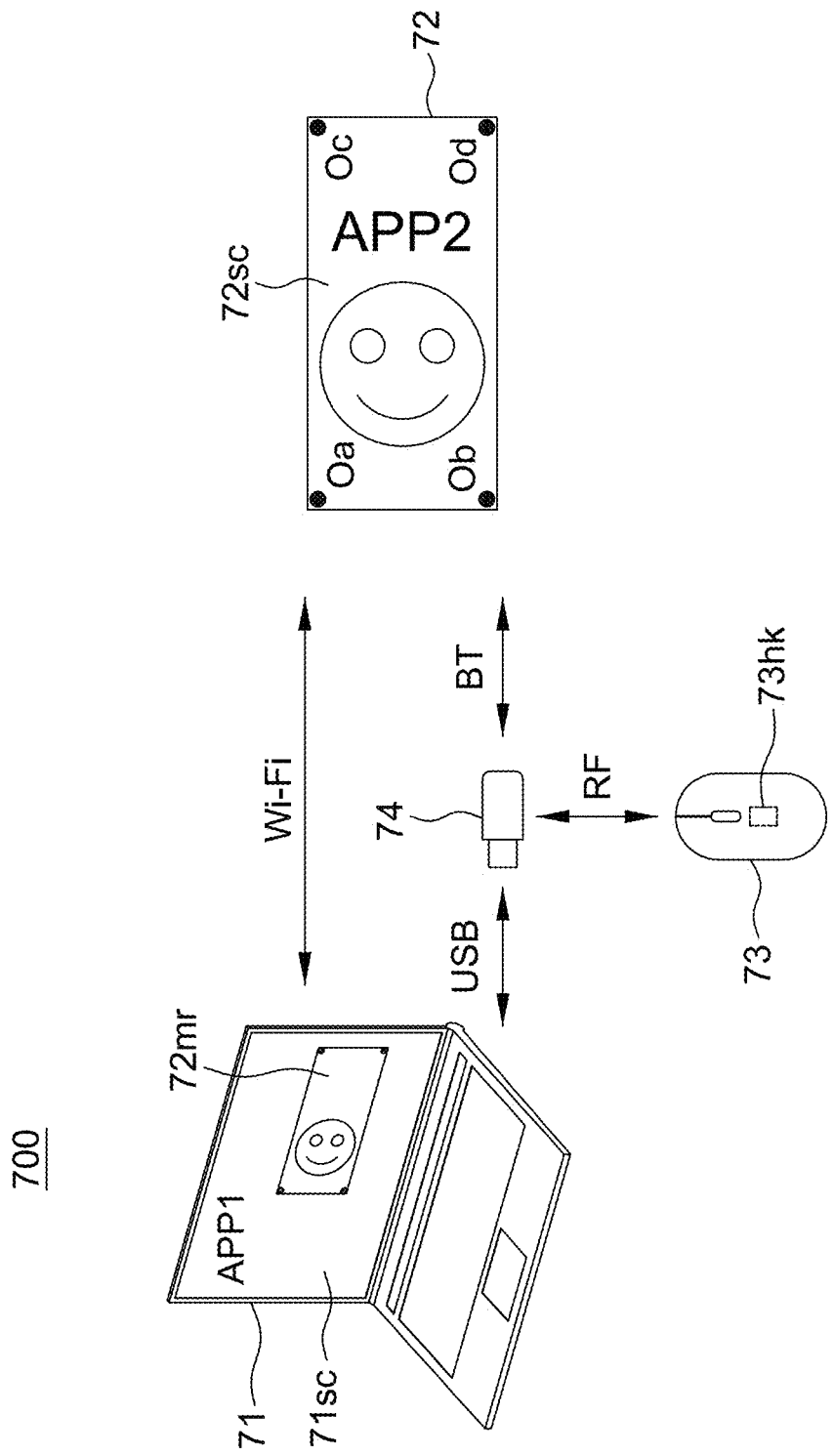
FIG. 7B is a schematic diagram of performing the screen mirroring in a transverse direction by a wireless communication system according to one embodiment of the present disclosure.

The present disclosure further provides a method for calibrating an origin point in the screen mirroring of a phone, or called cursor position calibration method. Referring to FIGS. 7A and 7B, the dongle 74 is connected to a first host computer 71 via a USB interface, connected to an input device (e.g., shown as a mouse device, but not limited to) 73 via a wireless interface (e.g., shown as a RF interface), and connected to a second host computer (e.g., shown as a phone) 72 via a Bluetooth interface. The input device 73 controls operations of the first host computer 71 and the second host computer 72 through the dongle 74.

In this aspect, the first host computer 71, the second host computer 72, the input device 73 and the dongle 74 are respectively similar to the above first host computer 11, the second host computer 12, the input device 13 and the dongle 14 only executing different functions by the application software and firmware.

As mentioned above, the first host computer 71 is arranged/embedded/installed with a first application software (shown as APP1) and/or the dongle 74 is arranged/embedded/installed with firmware (e.g., in MCU thereof) for executing the calibration method of this embodiment. The second host computer 72 is arranged/embedded/installed with a second application software (shown as APP2) for executing the calibration method of this embodiment. The "executing" herein includes, for example, generating/receiving the signals and/or data in the following steps.

The screen content of the second host computer 72 (i.e. images shown on a second screen 72*sc*) is projected onto a first screen 71*sc* of the first host computer 71 to form a mirrored image 72*mr* by a screen mirroring function, as shown in FIGS. 7A and 7B. A user can control the screen content by directly operating on the mirrored image 72*mr* using the input device 73, e.g., controlling a cursor position, a mouse click operation and a mouse roller operation so as to control operations of the second host computer 72. The method of initializing the screen mirroring function is different according to different products and is known to the art, and thus details thereof are not described herein. As shown in FIG. 6A, in the present disclosure, data of the screen mirroring is transferred via the Wi-Fi connection. One objective of this embodiment is to accurately match origin points of the mirrored image 72*mr* with the screen content so as to accurately control a position of cursor (e.g., referring the cursor shown in FIGS. 1 and 4) on the screen content.

In some portable devices, e.g., iPhone (as the second host computer 72), an origin point of the screen content is changed corresponding to the device rotation. For example, FIG. 7A shows that the operation system (e.g., iOS) of the portable device 72 defines the origin point of the screen content, which is shown in a longitudinal direction, at a corner Oa, but not limited to; whereas FIG. 7B shows that the operation system of the portable device 72 defines the origin point of the screen content, which is shown in a transverse direction, at a corner Ob, but not limited to. However, during performing the screen mirroring function, the first host computer 71 does not know a current status (i.e. rotation) of the portable device 72 and at which of the four corners the origin point is located, e.g., possible origin points being Oa and Od in the longitudinal direction, and possible origin points being Ob and Oc in the transverse direction. If origin points between the mirrored image 72*mr* and the screen content are not matched with each other, the cursor position on the portable device 72 will be different from the control in the mirrored image 72*mr* inputted by the input device 73, which is operated by a user. Therefore, cursor position calibration is required.

The calibration method of one aspect includes the steps below.

Figure 7C:
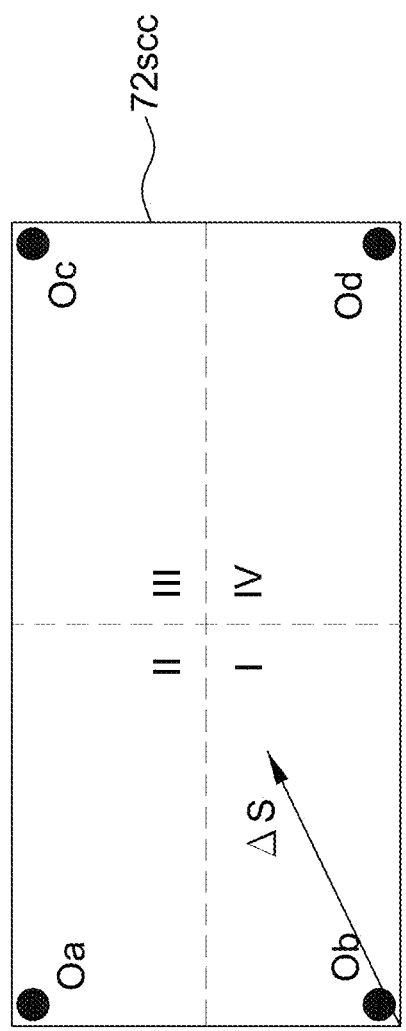
FIG. 7C is a schematic diagram of calibrating an origin point before the screen mirroring by a wireless communication system according to one embodiment of the present disclosure.

Step I: Before the screen mirroring begins (e.g., after a user selecting mirroring function respectively on the first host computer 71 and/or the second computer 72, and before the screen mirroring completed), the APP2 of the portable device 72 provides a calibration screen 72*scc*, e.g., as shown in FIG. 7C. The calibration screen 72*scc* may or may not be shown on the second screen 72*sc* of the portable device 72 without particular limitations. In this aspect, the calibration screen 72*scc* is not for being watched by the user but for the position calibration of origin point executed by the APP2.

Step II: Next, the APP2 of the portable device 72 divides the calibration screen 72*scc* into four quadrants, e.g., shown as quadrants I to IV, and starts to monitor the click event(s) of a mouse device (as the input device 73). It is appreciated that the quadrants I to IV shown in FIG. 7C are only intended to illustrate but not to limit the present disclosure. For example, if a current status of the portable device 72 is in a longitudinal direction as shown in FIG. 7A, areas of the quadrants I to IV are different from those shown in FIG. 7C.

Step III: Then, before starting to monitor a click event of the mouse device 73, the APP2 automatically communicates with the APP1 of the first host computer 71 to start the auto calibration procedure, e.g., the APP2 sending a command in order to move a cursor to a predetermined position on the calibration screen 72*scc*, which is pre-set to be within the quadrant I for instance.

Step IV: After receiving the command via the dongle 74, the APP1 controls the dongle 74 to output a movement ΔS or the APP1 in the dongle 74 outputs the movement ΔS, which is not actually generated by the input device 73, to control the cursor on the calibration screen 72*scc* of the portable device 72 to move to the predetermined position, e.g., a center of the quadrant I (expected quadrant), but not limited to the center.

Step V: Then, the operation system of the portable device 72 receives the movement ΔS, moves the cursor from an origin point (e.g., the cursor being controlled back to the origin point in the Step III or Step V) to the predetermined position and makes a click, which is not actually generated by the input device.

Step VI: The APP2 monitors the operation system of the portable device 72 to identify whether the click occurs in the correct quadrant, e.g., quadrant I herein. Please refer to FIG. 7C again, if origin points of the mirrored screen 72*mr* and the screen content are matched to each other (i.e. correct mirroring), the cursor is moved/changed from the corner Ob by a distance ΔS to the center of the quadrant I and make a click, i.e. in a correct quadrant herein. However, if origin points of the mirrored screen 72*mr* and the screen content are not matched to each other (i.e. incorrect mirroring), the cursor may be moved/changed from the corner Oa to a center of the quadrant II and make a click, may be moved/changed from the corner Oc to a center of the quadrant III and make a click, or may be moved/changed from the corner Od to a center of the quadrant IV and make a click, i.e. in an incorrect quadrant herein.

Step VII: When the APP2 identifies that the click happens in the correct quadrant, the screen mirroring is performed normally, i.e. showing the mirrored image 72*mr* on the first screen 71*sc*. After the mirrored image 72*mr* is projected on the first screen 71*sc*, the APP1 sends event signals generated by the input device 73, as mentioned in the above embodiments, to the portable device 72 via the dongle 74.

Step VIII: However, when the APP2 identifies that the click does not happen in the correct quadrant, the Steps III to VII are performed again to cause the APP1 to try another displacement and to click in another quadrant till the correct quadrant is identified. To complete the calibration, steps of the calibration method of this embodiment are executed one to three times.

In addition, the input device 73 adapted to the calibration method of this embodiment preferably includes a hotkey 73*hk* for a user to manually execute the calibration method of the present disclosure. For example, after the calibration method is completed (e.g., automatically completed before the mirrored image 72*mr* being shown) and the mirrored image 72*mr* is shown, the user lifts up the portable device 72 (e.g., having a phone call, but not limited to) and puts the portable device 72 back on a desk surface. In this case, origin points mismatch can happen again, e.g., direction of the portable device 72 being changed. In this case, the user triggers the execution of the above Steps III to VII to perform the calibration by operating (e.g., pressing, rotating or switching, but not limited to) the hotkey 73*hk*.

In another aspect, each time the user operates the hotkey 73*hk* once, the APP1 changes the origin point of the mirrored image 72*mr* once. If a click in the mirrored image 72*mr* made by the user appears at a correct cursor position (i.e. an expected position) in the screen content, it means that the match is completed. However, if a click in the mirrored image 72*mr* made by the user does not appear at a correct cursor position in the screen content, the user operates the hotkey 73*hk* another time till the correct cursor position occurs. In this aspect, at most three times of operating the hotkey 73*hk* is required to complete the manual calibration.

In the calibration method of the present disclosure mentioned above, the APP2 automatically communicates with the APP1 via the dongle 74 to start the calibration, and the APP2 identifies whether the origin points are matched to each other or not by identifying a clicked (automatically by APP or manually by user) quadrant.

In the calibration method of the present disclosure mentioned above, the origin point/cursor position calibration is automatically accomplished before starting the screen mirroring, and the matching state is recovered after the screen mirroring and the origin points mismatch occur by operating the hotkey 73*hk*. As mentioned above, if the input device 73 is a keyboard, the hotkey is a predetermined key on the keyboard.

In addition, in an aspect that the APP2 is able to acquire a detection result of an accelerometer (e.g., G-sensor) of the portable device 72, the APP2 is able to directly identify an origin point of the screen content according to information of the accelerometer and send the information to the APP1. In this case, the cursor position can be accurately controlled even without performing the above calibration method.

The APP2 of the present disclosure further acquires information of a screen rotation and a device rotation (e.g., according to a detection result of the accelerometer), and sends the information to the APP1 via the Bluetooth or Wi-Fi connection to allow the mirrored image 72*mr* to show a correct direction (i.e. in portrait orientation) in performing the screen mirroring. For example, when the portable device 72 is laid transversely as shown in FIG. 7B, a direction of the screen content can be in a longitudinal direction of the portable device 72, e.g., the third party APP of portable device 72 having no screen rotating function or the function being disabled. The APP2 detects the screen rotation direction and sends the detection result to the APP1 such that the mirrored image 72*mr* is shown in the first screen 71*sc* as the direction in FIG. 7A rather than the direction in FIG. 7B. In this way, the user can always watch the mirrored image 72*mr* shown in portrait orientation thereby improving the user experience in performing the screen mirroring.

The method of detecting the screen rotating direction so as to know the portrait orientation of screen content is known to the art, and thus details thereof are not described herein.

The present disclosure further provides a method of positioning a cursor in the screen content of a portable device, as the second host computer.

Figure 8:
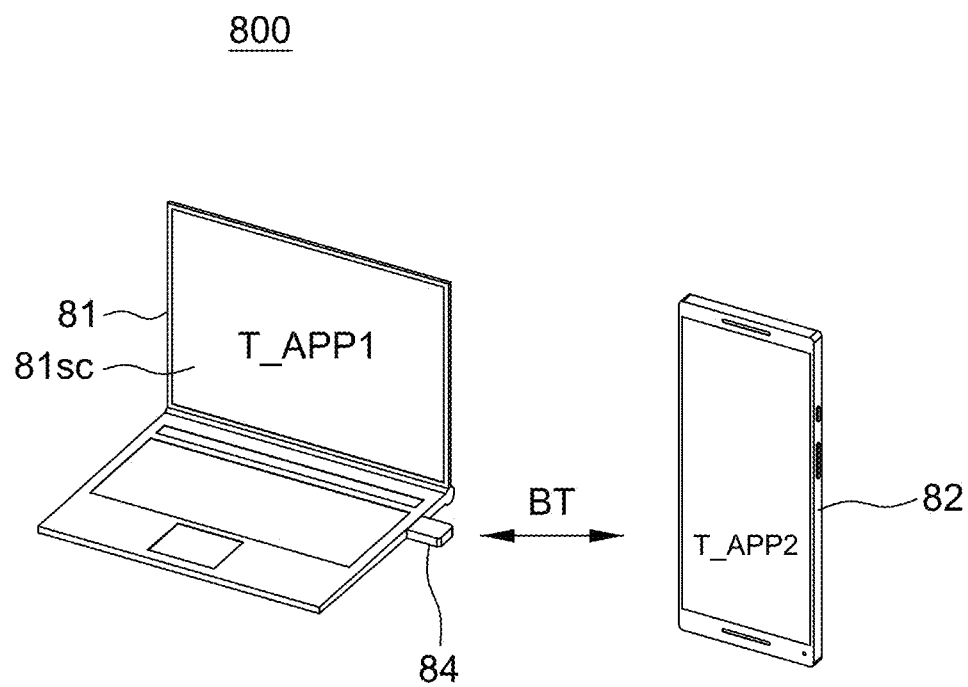
FIG. 8 is a schematic diagram of a wireless communication system of the present disclosure embedded with test software.

Please refer to FIG. 8, it shows a wireless communication system 800 for executing a screen mirroring function according to one embodiment of the present disclosure. The wireless communication system 800 includes a first host computer 81, a dongle 84 and a portable device 82. As mentioned above, the first host computer 81 is connected to the dongle 84 using a USB interface; and the dongle 84 is connected to the portable device 82 using a Bluetooth interface. The first host computer 81, the second host computer 82 and the dongle 84 are respectively similar to the above first host computer 11, the second host computer 12 and the dongle 14 only executing different functions by application software and firmware therein.

When the screen content of the portable device 82 is projected onto a first screen 81sc of the first host computer 81 using screen mirroring, the user controls a cursor (e.g., referring to 12csr shown in FIG. 1) on the screen content using a mouse device (e.g., referring to 73 shown in FIGS. 7A and 7B). As mentioned above, when the user moves a cursor (or called first cursor) in a mirrored image of the first host computer 81, the APP1 of the first host computer 81 controls the dongle 84 to output a movement to the portable device 82, and the operation system of the portable device 82 controls a cursor (or called second cursor) in the screen content to a corresponding position. The present disclosure further provides a wireless communication system 800 in which the APP1 of the first host computer 81 determines the movement of a target point according to lookup tables, and the movement found in the lookup tables is sent to the portable 82 via the dongle 84.

To construct the lookup tables, the first host computer 81 is installed with a first test software T_APP1, and the second host computer 82 is installed with a second test software T_APP2 as shown in FIG. 8.

Please refer to FIG. 9 together, the method of determining a cursor movement according to one embodiment of the present disclosure is described hereinafter.

Step S91: In the beginning, the dongle 84 is connected to the first host computer 81, and the Bluetooth connection (shown as BT) between the dongle 84 and the portable device 82 is completed such that the dongle 84 is used as a BLE mouse of the portable device 82. In this method, a physical mouse device is not required, and thus FIG. 8 does not show an input device.

Steps S9121 to S9124 are executed by the T_APP1, a Step S9131 is executed by the operation system of the portable device 82, and Steps S9132 to S9133 are executed by the T_APP2.

Figure 10:
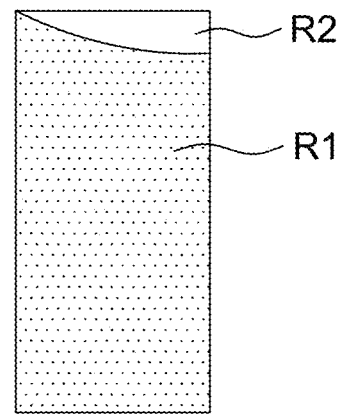
FIG. 10 is a schematic diagram of a screen area covered by output movements during constructing a lookup table using test software by a wireless communication system according to one embodiment of the present disclosure.

Step S9121: Firstly, the T_APP1 controls a cursor on a screen of the portable device 82 to return to an origin point. Referring to FIG. 10, the origin point is set as a top-left corner of the screen, but not limited to the top-left corner. FIG. 10 shows the screen content of the portable device 82.

Step S9122: Next, the T_APP1 controls the cursor to move a predetermined distance from the origin point by controlling the dongle 84 to send a corresponding movement to the portable device 82.

Step S9123: The T_APP1 identifies whether a predetermined condition is fulfilled or not, e.g., identifying whether a predetermined number of movements has been sent. It is noticed that a part of the screen content cannot be covered by the predetermined distances sent by the T_APP1. For example, FIG. 10 shows a first region R1 indicating an area that is covered by cursor coordinates associated with the predetermined movements being sent, and a second region R2 indicating an area that is not covered by cursor coordinates associated with the predetermined movements being sent.

If the predetermined condition is achieved, the Step S9124 is entered and the lookup table constructing procedure is over. However, if the predetermined condition is not achieved, the Step S9121 is returned to repeatedly execute the Steps S9121 to S9123.

Step S9131: As mentioned above, after the T_APP1 sends a movement via the dongle 84 in the Step S9122, the operation system of the portable device 82 receives the movement and moves/changes a cursor to a corresponding coordinate.

Step S9132: Meanwhile, the T_APP2 of the portable device 82 records the relationship between the movement sent by the T_APP1 via the dongle 84 and the corresponding cursor coordinate actually being reached on portable device 82 (within the first region R1 as shown in FIG. 10).

Step S9133: Therefore, after the T_APP1 repeatedly executes the Steps S9121 to S9123 and sends multiple movements, the T_APP2 records a first lookup table (shown as LUT in FIG. 9), which contains cursor coordinates in the first region R1 corresponding to every movement. That is, one movement sent from the T_APP1 via the dongle 84 has a corresponding one cursor coordinate on the portable device 82.

The T_APP1 and T_APP2 are for constructing the first lookup table and a second lookup table (mentioned below) before shipment. In one aspect, after the first and second lookup tables are formed, the T_APP1 and T_APP2 are no longer required to be left in the first host computer 81 and the second host computer 82. In actual operation, the APP1 and APP2 are used.

Figure 13:
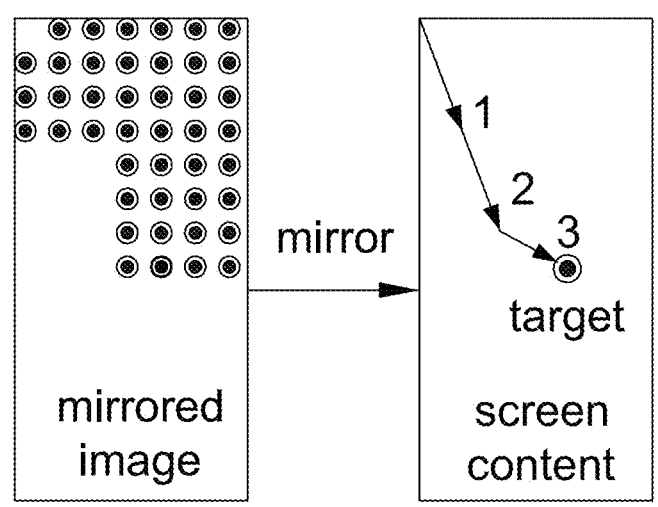
FIG. 13 is a schematic diagram of outputting at least one movement by a first host computer using a second lookup table during the screen mirroring run by a wireless communication system according to one embodiment of the present disclosure.

The first lookup table is embedded in the APP1 (e.g., referring to FIGS. 7A and 7B). In this way, when a user projects the screen content of the portable device 82 onto the first screen 81sc of the first host computer 81, each time when the user clicks at one position in the mirrored image (e.g., 72mr shown in FIGS. 7A and 7B) using the input device, the APP1 checks the first lookup table to find a corresponding movement and then controls the dongle 84 to send the found movement to the portable device 82. The operation system of the portable device 82 controls a cursor thereon to directly move to a predetermined coordinate corresponding to the movement without requiring to arrive the predetermined coordinate by several paths, as shown in FIG. 13 as an example.

Figure 11:
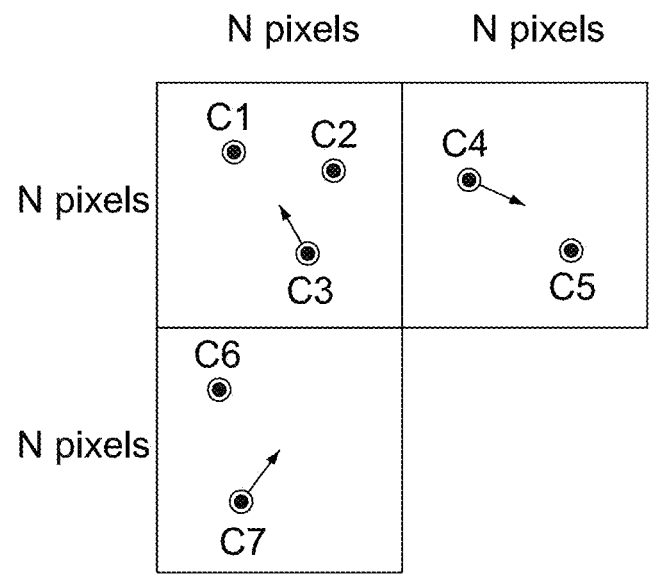
FIG. 11 is a schematic diagram of dividing a screen area into multiple pixel regions during constructing a first lookup table using test software by a wireless communication system according to one embodiment of the present disclosure.

In addition, to reduce a size of the first lookup table, in constructing the first lookup table, the T_APP2 divides the screen content into multiple pixel regions. For example referring to FIG. 11, the T_APP2 takes each N×N pixel region as one coordinate, wherein N is a proper positive integer which is determined according to a screen size of the portable device 82 and the position required accuracy without particular limitations.

For example, among the multiple movements sent by the dongle 84 (e.g., in the Steps S9121 to S9123), a first pixel region of the screen content includes three cursor coordinates C1, C2 and C3; a second pixel region of the screen content includes two cursor coordinates C4 and C5; and a third pixel region of the screen content includes two cursor coordinates C6 and C7, and so on. In one aspect, T_APP2 selects one coordinate within one pixel region closest to a center (any position and not limited to the center) of the one pixel region as the coordinate of the one pixel region, e.g., taking C3, C4 and C7 as coordinates of the first, second and third pixel regions, respectively. In this way, in the process of repeatedly executing the Steps S9121 to S9123, the T_APP2 records a single cursor coordinate corresponding to multiple movements within the same pixel region so as to reduce the size of the first lookup table and to increase the operating speed in screen mirroring operation.

Figure 9:
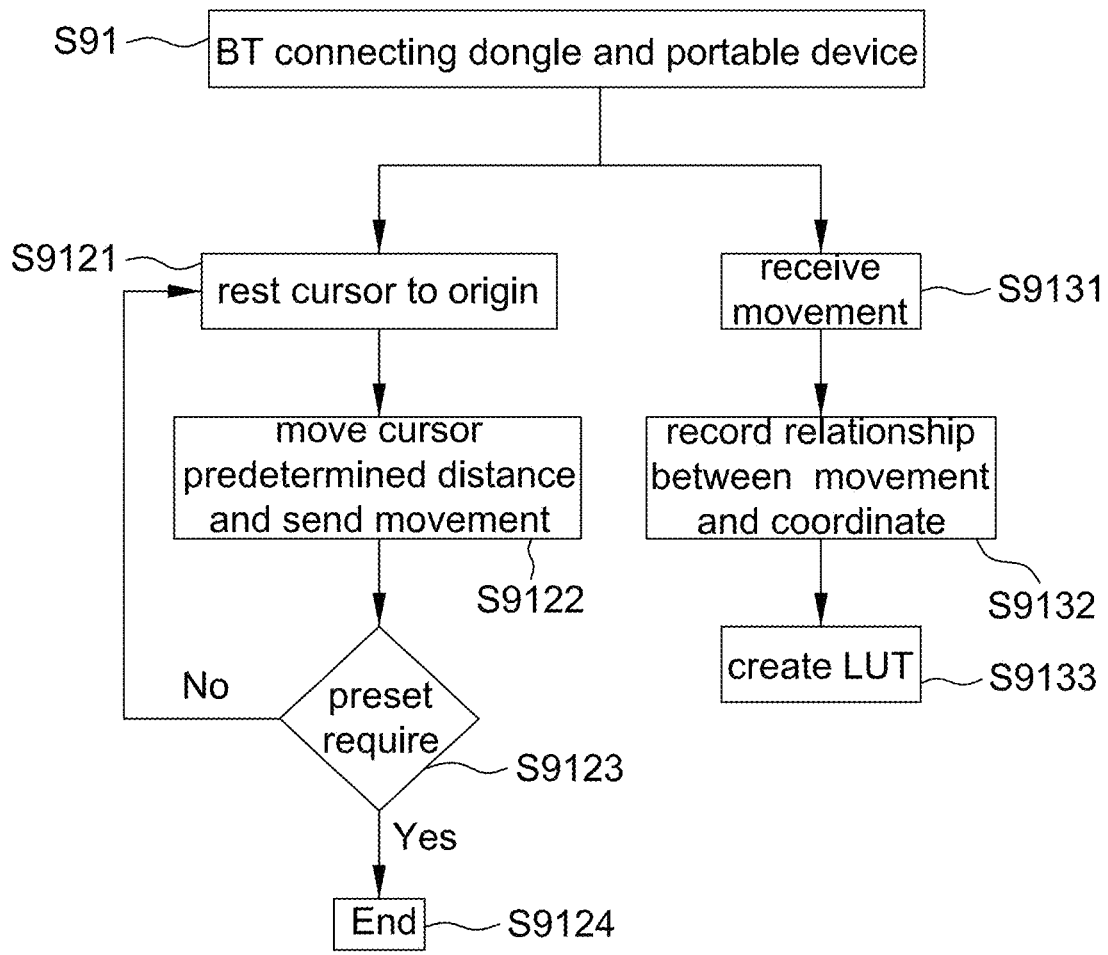
FIG. 9 is a flow chart of constructing a first lookup table using test software by a wireless communication system according to one embodiment of the present disclosure.

In some scenarios, when a part of the screen content of the portable device 82, e.g., second region R2 in FIG. 10, is not covered by the coordinates in Steps S9121 to S9123 of FIG. 9, a second lookup table needs to be constructed in order to move the cursor in the screen content to the second region R2 of the screen content. The second lookup table is also formed before shipment as described below.

Please refer to FIGS. 8 and 13 together, the screen content of the portable device 82 is projected onto the first screen 81sc of the first host computer 81 at first. Next, the T_APP1 moves the cursor on the first screen 81sc to an origin point of a mirrored image. Meanwhile, the T_APP1 divides a region corresponding to the second region R2 of the mirrored image of the portable device 82 into multiple grid points, as shown in the mirrored image in FIG. 13, wherein the number and density of the grid points are determined according to the required position accuracy. Then, the T_APP1 calculates distances between the origin point and grid points closest to the origin point as well as distances between grid points to be recorded as a second lookup table. The second lookup table is also recorded in the APP1. It is appreciated that the more grid points have, the larger size of the second lookup table is formed.

In actual operation, when a user operates the input device desired to move the cursor on the portable device 82 to a target point "3" (referring to FIG. 13), the T_APP1 calculates the shortest distance to the target point "3" and grid points will be passed, e.g., shown as grid points "1" and "2". Next, the T_APP1 checks the second lookup table regarding a first movement from the origin point to the grid point "1", a second movement from the grid point "1" to the grid point "2", and a third movement from the grid point "2" to the grid point "3", and then controls the dongle 84 to sequentially output the first, second and third movements to the portable device 82 to realize the purpose of controlling the cursor on the portable device 82.

Figure 12:
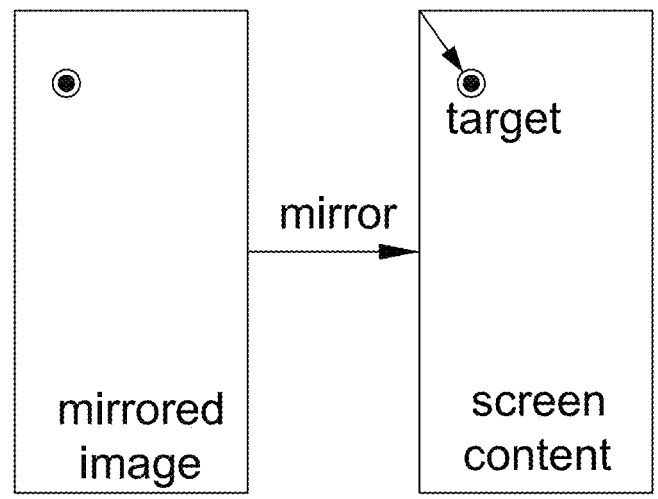
FIG. 12 is a schematic diagram of outputting a movement by a first host computer using a first lookup table during the screen mirroring run by a wireless communication system according to one embodiment of the present disclosure.

In brief, before shipment, the present disclosure previously builds up a first lookup table and a second lookup table for being recorded in the APP1. The first lookup table is adapted to the first region R1 of FIG. 10 and the second lookup table is adapted to the second region R2 of FIG. 10. In actual operation, the screen content of the portable device 82 is projected to the first host computer 81 to form a mirrored image, e.g., 72*mr* shown in FIGS. 7A and 7B. When a user clicks on the mirrored image using the input device (e.g., 73 shown in FIGS. 7A and 7B), the APP1 firstly identifies whether the click is within the first region R1 or in the second region R2. When a click position is within the first region R1, the APP1 determines one movement according to the first lookup table recorded therein and controls the dongle 84 to output the one movement to the portable device 82, e.g., referring to FIG. 12. When the click position is within the second region R2, the APP1 determines at least one movement according to the second lookup table recorded therein and controls the dongle 84 to output the at least one movement to the portable device 82, e.g., referring to FIG. 13. According to the present disclosure, the portable device 82 shows different traces of cursor movement in the first region R1 and the second region R2, respectively.

It should be mentioned that although the above embodiments are described in that a mouse device is used as an input device, the present disclosure is not limited thereto. In other aspects, the input device is a wireless keyboard, a wireless joystick or a wireless touchpad without particular limitations.

It is appreciated that the first host computer and the second host computer respectively include a processor (e.g., a CPU or MCU) to run the respective operation system and application software.

It should be mentioned that although the above embodiments are described in that the communication dongle is connected to the first host computer using a USB interface, the present disclosure is not limited thereto. In other aspects, the communication dongle is connected to the first host computer via other series interface or wired interface.

It should be mentioned that although the above embodiments are described in that the communication dongle is Bluetooth connected to a single second host computer, the present disclosure is not limited thereto. In other aspects, the communication dongle is Bluetooth connected to multiple host computers and at least one hotkey on an input device is used to switch control authority to one host computer desired to be controlled.

It should be mentioned that the APP1 and APP2 of the present disclosure are arranged to execute at least one function of the multiple embodiments mentioned above, even including the functions of T_APP1 and T_APP2.

It should be mentioned that the "mirroring" mentioned in the present disclosure is not limited to mirroring a phone screen to a computer screen, and also includes mirroring a computer screen to another computer screen.

As mentioned above, it is possible to use multiple computers to execute the task or entertainment so as to improve the efficiency and convenience. However, current communication dongles are mainly used to connect a single host device to multiple peripherals but cannot switching control between multiple host devices. Accordingly, the present disclosure further provides a wireless communication system capable of switching control authority between multiple host computers (e.g., FIGS. 1 and 4) and capable of calibrating and determining a cursor position during the screen mirroring (e.g., FIGS. 7 to 13) to significantly improve the user experience and solve the issues of screen mirroring.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. A wireless communication system, comprising:
    a first application software embedded in a first host computer;
    a dongle, configured to connect to the first host computer using a USB interface and connect to a second host computer using a Bluetooth interface;
    a first input device, comprising a hotkey, and configured to connect to the dongle using an RF interface to send a first event signal to the first host computer,
    wherein after receiving a pressed signal of the hotkey via the dongle, the first application software is configured to control the dongle to transfer the first event signal from the first input device directly to the second host computer via the dongle to cause the first input device to control operation of the second host computer.

2. The wireless communication system as claimed in claim 1, wherein
    the first host computer is a notebook computer,
    the first input device is a mouse device or a keyboard, and the second host computer is a smartphone, a tablet computer or a notebook computer.

3. The wireless communication system as claimed in claim 1, wherein during the first event signal from the first input device being transferred to the second host computer, the hotkey is further configured to
provide the first event signal from the first input device to the first host computer again via the dongle without providing to the second host computer again via the dongle,
control the second host computer to show recently executed APPs, wherein the second host computer is further configured to select one of the recently executed APPs according to a direction signal from the first input device via the dongle,
change an input method corresponding to different languages,
control the second host computer to go to a home desktop when the second host computer is a smartphone,
bring up an on-screen keyboard of the second host computer when the second host computer is a smartphone, or
performing cursor position calibration.

4. The wireless communication system as claimed in claim 1, wherein the hotkey is exclusive to switching the first input device to control the first host computer or the second host computer.

5. The wireless communication system as claimed in claim 1, further comprising a second input device connected to the first host computer not via the dongle or embedded in the first host computer, wherein after receiving the pressed signal of the hotkey via the dongle, the first application software is further configured to
intercept a second event signal from the second input device and transfer the intercepted second event signal to the second host computer via the dongle, and
control the first host computer not to operate corresponding to the second event signal.

6. The wireless communication system as claimed in claim 5, wherein
the first host computer is a notebook computer comprising a touchpad, and
while receiving an operation signal of the touchpad, the first application software is further configured to provide the first event signal and the second event signal back to the first host computer without providing to the second host computer.

7. A wireless communication system, comprising:
a first application software embedded in a first host compute;
a dongle, configured to connect to the first host computer using a USB interface and connect to a second host computer using a Bluetooth interface;
a first input device, comprising a hotkey, and configured to connect to the dongle using an RF interface to send a first event signal to the first host computer,
wherein after receiving a pressed signal of the hotkey via the dongle, the first application software is configured to control the dongle to transfer the first event signal from the first input device to the second host computer, without passing through the first host computer, via the dongle to cause the first input device to control operation of the second host computer.

8. A wireless communication system, comprising:
a first host computer, embedded with a first application software;
a dongle, configured to connect to the first host computer using a USB interface;
a first input device, comprising a hotkey, and configured to connect to the dongle using a RF interface to send a first event signal to the first host computer; and
a second host computer, configured to connect to the dongle using a Bluetooth interface,
wherein after receiving a pressed signal of the hotkey via the dongle, the first application software is configured to intercept the first event signal from the first input device and transfer the intercepted first event signal to the second host computer via the dongle to cause the first input device to control operation of the second host computer, and
during the first event signal from the first input device being transferred to the second host computer, the hotkey is further configured to
provide the first event signal from the first input device to the first host computer again via the dongle without providing to the second host computer again via the dongle,
control the second host computer to show recently executed APPs, wherein the second host computer is further configured to select one of the recently executed APPs according to a direction signal from the first input device via the dongle,
change an input method corresponding to different languages,
control the second host computer to go to a home desktop when the second host computer is a smartphone,
bring up an on-screen keyboard of the second host computer when the second host computer is a smartphone, or
performing cursor position calibration.

* * * * *